F. E. WHITNEY & M. MELIA.
MEANS FOR HOLDING BATTERY ELEMENTS.
APPLICATION FILED JULY 27, 1916.

1,267,613.

Patented May 28, 1918.

Inventors.—
Frank E. Whitney,
Martin Melia,
by their Attorneys
Howson & Howson

UNITED STATES PATENT OFFICE.

FRANK E. WHITNEY AND MARTIN MELIA, OF PHILADELPHIA, PENNSYLVANIA, ASSIGNORS TO COMMERCIAL TRUCK COMPANY OF AMERICA, OF PHILADELPHIA, PENNSYLVANIA, A CORPORATION OF PENNSYLVANIA.

MEANS FOR HOLDING BATTERY ELEMENTS.

1,267,613.   Specification of Letters Patent.   Patented May 28, 1918.

Application filed July 27, 1916. Serial No. 111,625.

*To all whom it may concern:*

Be it known that we, FRANK E. WHITNEY and MARTIN MELIA, citizens of the United States, and residents of the city and county of Philadelphia, State of Pennsylvania, have invented Means for Holding Battery Elements, of which the following is a specification.

One object of our invention is to provide a relatively simple, inexpensive and easily utilized device for preventing movement and positively holding together the elements of a storage battery, the construction being such that the device will automatically close up any spaces which may exist so that the separators, electrodes, etc., shall be maintained in the most intimate contact.

We further desire to provide a holding device of the character noted which may be easily inserted in or removed from a battery cell and which shall be unaffected by the electrolyte.

These objects and other advantageous ends we secure as hereinafter set forth, reference being had to the accompanying drawings, in which, Figure 1 is an elevation partly in section illustrating a storage battery cell equipped with our invention;

Figure 1:
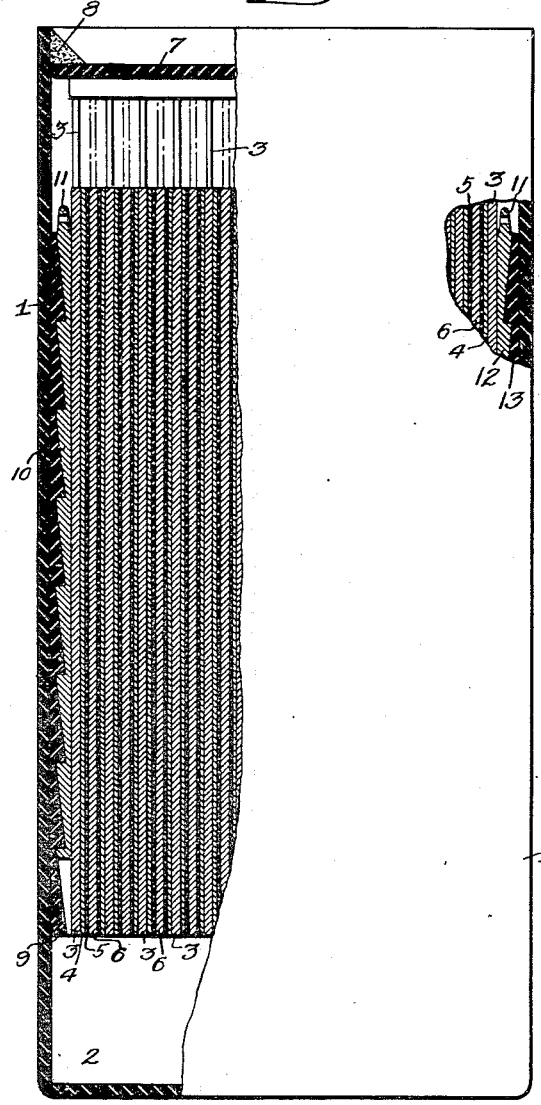
Figure 2:
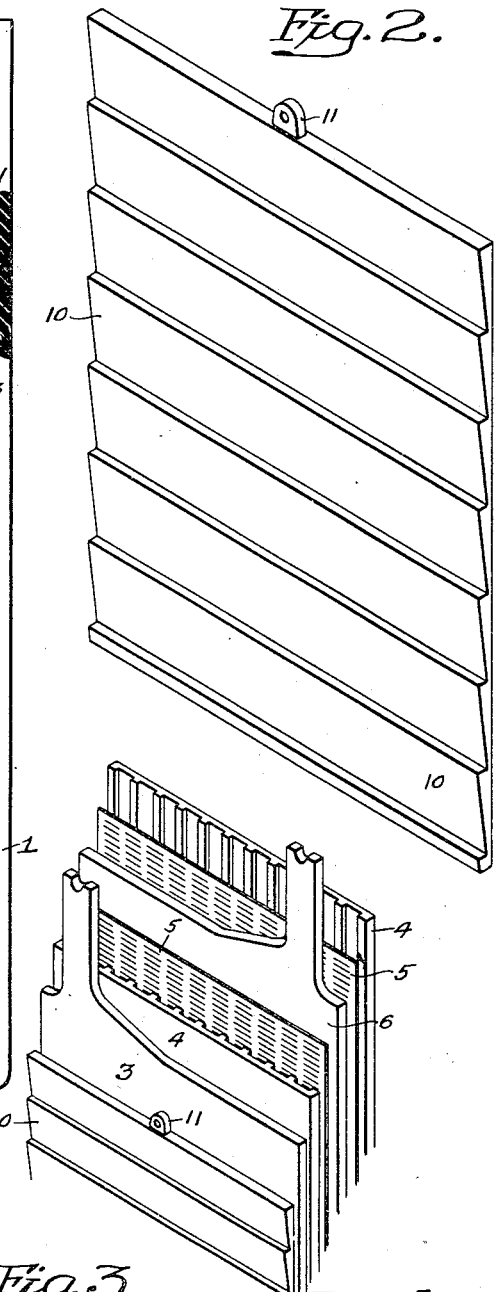
Fig. 2 is a perspective view of one of the wedging elements.
Figure 3:
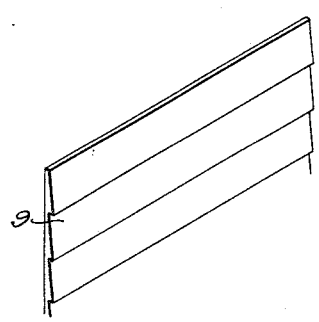
Fig. 3 is a detached perspective view of certain of the parts illustrated in Fig. 1.

In the above drawing, 1 represents the hard rubber or glass jar or container which has extending transversely across its lower portion two or more upwardly projecting ribs 2 whereby the plates, etc., are supported at some distance from the bottom of the jar. In the present instance we have illustrated a wooden or other porous separator 4 and a rubber separator 5 interposed between each of the positive electrodes 6 and the adjacent negative electrodes 3, it being noted that the rubber separators are relatively thin and flexible and have narrow, parallel, elongated slots.

Each of the positive electrodes 6 has one of these rubber separators mounted immediately adjacent its face and between each of said rubber separators and the adjacent negative plate is a porous separator 4 preferably made of a thin plate of wood having parallel vertically projecting ribs on that face adjacent the rubber separator. The positive and negative electrodes are provided with suitable lugs and terminal strips and the battery cell is closed by a cover 7 preferably held in place by sealing material 8 placed in the corners between it and the sides of the cell.

In order to press the separators and plates into the most intimate contact and maintain them therein so that their relative movement is effectually prevented and all spaces between the positive plates and the rubber separators taken up, we provide a hard rubber or other suitable plate 9 of practically the same shape and area as one of the electrodes and form this with horizontally extending ribs which increase in thickness from the top toward the bottom so that the plate in effect consists of a series of horizontally elongated wedges having their thicker portions downward. Between this rubber plate 9 and the adjacent battery electrode 3 we mount a second and similarly formed plate 10 which however is preferably made of the same material as that constituting the frames of the electrodes, in the present instance lead, although obviously it may be made of any other suitable relatively heavy material which is not attacked by the electrolyte.

This second plate like the plate 9 is provided with a series of horizontal ribs or integral wedges which however have their thick portions upper-most although their dimensions are practically the same as those of said plate 9. This second plate is preferably provided with a perforated lug or eye 11 at its upper edge and it is noted that its length is considerably less than that of the latter plate.

When these two plates are mounted between one side of the battery cell and the nearest battery electrode, one with the thin part of its ribs adjacent the thick portion of the ribs of the other, said plates and separators of the battery may be forcibly moved and held together by forcing the plate 10 downward; it being noted that this plate is held in its uppermost position while the electrodes and separators are being put in place. In moving down, its inclined surfaces will ride upon those of the plate 9 and force it outwardly, thus pressing or forcing together the battery plates and electrodes.

Thereafter while the battery is in service this second plate 10 will automatically act to take up any space which may occur between the electrodes and separators due to vibration or change in dimensions in any of the parts, since its weight will constitute a continuously acting force tending to move it down relatively to the plate 9.

Ordinarily the outer electrode on the opposite side of the cell will rest directly against the vertical wall of the container, though if desired a second pair of wedge elements 12 and 13 can be mounted between it and said wall, in which case they will act as above described. Owing to this tight binding together of the separators and electrodes, the active material is more effectually than heretofore retained in position on the positive electrodes, thus not only increasing the life of the plates but preventing possible damage to plates and separators which would otherwise occur owing to their relative movement.

If it be desired to remove the electrodes and separators, the holding members 9 and 10 are first taken out by drawing the latter upwardly by means of a hook placed through the perforation of the lug 11. When said plate has been moved to a position in which the edges of its ribs are out of engagement with the ribs of the plate 9, both of the plates are free to be bodily lifted out of the cell.

It is to be understood that without departing from our invention the plate 9 may be permanently fixed to or in some cases made integral with the wall of the jar or container 1. In such case the plate 10 will be held up in the position shown in Fig. 1, until the elements and separators have been inserted and will then be forced down to hold these in place or be allowed to gradually work its way down to a final holding position under the action of gravity.

A further advantage of my arrangement and construction lies in the fact that when one or more of the elements is raised in order to remove the same from the cell, the member 10 is necessarily also drawn upwardly and at the same time moved toward the member 9. More room is thus provided for the various elements, etc., so that their removal is facilitated.

We claim:—

1. The combination of a battery jar; electrodes and separators therein; with a plurality of plates having inclined co-acting surfaces and free to move relatively to each other to cause the inclined surface of one plate to ride upon that of the other plate and take up any spaces between the electrodes.

2. The combination of a battery cell; and two plates between one wall of the jar of said cell and the face of the electrode adjacent said wall, said plates having inclined co-acting surfaces and one of them being weighted and free to move down relatively to the other.

3. The combination of a battery cell; with an automatically acting device for taking up any spaces between the electrodes and separators of the cell, said device including a plate of relatively heavy material having a series of transverse substantially parallel outwardly inclined surfaces formed to coact with similar surfaces within the cell.

4. The combination of a battery cell consisting of a jar; electrodes; separators; and an expansible device having two series of substantially parallel coacting inclined faces for forcibly pressing together the separators and electrodes within the jar.

5. The combination of a battery jar; positive and negative electrodes therein; relatively thin non-conducting perforated separator plates adjacent the faces of each positive electrode; porous separator plates between each perforated plate and the adjacent negative plate; and means for clamping said electrodes and separators within the jar to retain the porous plates in intimate engagement with the faces of the positive electrodes including at least one plate of relatively heavy material having a plurality of transverse ribs providing surfaces acutely inclined to its plane.

6. The combination with a battery cell of means for preventing movement of the electrodes, the same consisting of a relatively light plate having horizontally elongated inclined surfaces; and a relatively heavy plate likewise having elongated inclined surfaces coacting with those of said first plate and mounted between it and the adjacent electrode of the cell, said second plate being free to move down to automatically press together the electrodes of the cell.

7. The combination in a battery of a jar; electrodes and separators therein; two plates respectively of insulating material and metal having inclined coacting surfaces and mounted to permit said metal plate moving under the action of gravity to cause the electrodes and separators to be tightly held within the jar.

FRANK E. WHITNEY.
MARTIN MELIA.